United States Patent [19]

Ohara et al.

[11] Patent Number: 4,837,127

[45] Date of Patent: * Jun. 6, 1989

[54] RECORDING MEDIUM

[75] Inventors: Shinichiro Ohara, Shizuoka; Kyoichi Naruo, Kanagawa, both of Japan

[73] Assignee: Fuji Photo Film Co., Ltd., Japan

[ * ] Notice: The portion of the term of this patent subsequent to Nov. 29, 2005 has been disclaimed.

[21] Appl. No.: 868,126

[22] Filed: May 28, 1986

[30] Foreign Application Priority Data

May 28, 1985 [JP] Japan ................................. 60-114733

[51] Int. Cl.$^4$ ................................................ G03C 1/72
[52] U.S. Cl. ..................................... 430/270; 430/346; 430/495; 430/945; 430/964; 346/135.1
[58] Field of Search ............... 430/964, 945, 495, 270, 430/346; 346/135.1

[56] References Cited

U.S. PATENT DOCUMENTS

| | | | |
|---|---|---|---|
| 4,188,214 | 2/1980 | Kido et al. | 430/495 |
| 4,291,119 | 9/1981 | Kido et al. | 430/495 |
| 4,500,889 | 2/1985 | Wada et al. | 403/945 |

FOREIGN PATENT DOCUMENTS 2558529  7/1976  Fed. Rep. of Germany ...... 403/495

*Primary Examiner*—Paul R. Michl
*Assistant Examiner*—Lee C. Wright
*Attorney, Agent, or Firm*—Ostrolenk, Faber, Gerb & Soffen

[57] ABSTRACT

A recording medium comprising a substrate and a recording layer arranged on the substrate, said recording layer being removable by irradiation of radiation having high energy density thereto through evaporation or fusion in the area having received said irradiation, which is characterized in that said recording layer comprises indium and at least one metal compound selected from the group consisting of a metal sulfide, a metal fluoride and a metal oxide and contains at least one metal showing a surface tension of not less than 600 dyne/cm within temperatures of the melting point thereof to a temperature higher than the melting point by 300° C.

14 Claims, No Drawings

RECORDING MEDIUM

BACKGROUND OF THE INVENTION

1. Field of the invention

This invention relates to a recording medium, and more particularly to a recording medium for writing and/or reading information by means of laser beam of high energy density.

2. Description of prior Arts

Information recording media utilizing a beam of high energy density such as laser beam have been developed in recent years and have been put to practical use. Such recording medium is generally called an "optical disc", and the practical applications thereof have been found, for example, as video disc and audio disc as well as disc memory for large-capacity computer and large-capacity static image file.

Writing of information on the optical disc can be conducted, for example, by irradiating the optical disc with a laser beam. Under irradiation with the laser beam, the irradiated area of the recording layer of the optical disc absorbs the energy of beam and a rise in temperature locally occurs and as a result, the recording layer is removed through evaporation or fusion on the area having received the irradiation, whereby the recording of information can be made. Reading of information from the optical disc is also conducted by irradiating the optical disc with laser beam. The information can be reproduced by detecting reflected light or transmitted light corresponding to the alteration in the optical characteristics of the recording layer.

The optical disc generally comprises a disc-shaped transparent substrate of a plastic or glass material and a recording layer composed of a metal or a semi-metal such as Bi, Sn, In or Te which is provided on the substrate. It has been reported in Japanese Patent Publications No. 58(1983)-33120 and No. 58(1983)-15319 that the sensitivity of the recording layer containing the metal or semi-metal can be enhanced by incorporation of a metal sulfide such as GeS, a metal fluoride such as $MgF_2$ or a metal oxide such as $MoO_2$ into the layer.

Further, a subbing layer of a ploymer material may be provided between the substrate and the recording layer so that the adhesion between the substrate and recording layer is ensured and the sensitivity of the optical disc is enhanced.

Furthermore, Japanese Patent Provisional Publication No. 50(1985)-181151 proposes to provide a metal film between the substrate and recording layer for enhancing the sensitivity of the recording layer.

SUMMARY OF THE INVENTION

It is an object of the present invention to provide a recording medium which is improved in the reliability in the recording procedure.

More specifically, the object of the invention is to provide a recording medium showing less bit error rate (B.E.R.) in a procedure for recording information on the medium.

It is another object of the invention to provide a recording medium which is improved in sensitivity to radiation having high energy density such as laser beam, in addition to improved reliability in the recording procedure.

The present invention resides in the improvement of a recording medium comprising a substrate and a recording layer arranged on said substrate, said recording layer being removable by irradiation of radiation having high energy density thereto through evaporation or fusion in the area having received the irradiation, in which said recording layer comprises indium and at least one metal compound selected from the group consisting of a metal sulfide, a metal fluoride and a metal oxide and contains at least one metal showing a surface tension of not less than 600 dyne/cm within temperatures of the melting point thereof to a temperature higher than the melting point by 300° C.

PREFERRED EMBODIMENTS OF THE INVENTION

The recording medium of the present invention can be prepared, for example, in the following manner.

The substrate material employed in the invention can be slected from any materials which have been employed as the substrates of the conventional recording media. From the viewpoint of optical characteristics, smoothness, workability, handling properties, long-term stability and manufacturing cost, preferable examples of the substrate material include glass such as tempered glass, acrylic resins such as cell-cast polymethly methacrylate and injection-molded polymethyl methacrylate; vinyl chloride resins such as polyvinyl chloride and vinyl chloride copolymer; polycarbonate resins; and epoxy resins. Among these materials, glass, acrylic resins and polycarbonate resins are preferred.

The surface of the substrate on which a recording layer is placed may be provided with a subbing layer for the purpose of improving smoothness, adhesion to the recording layer and sensitivity by heat insulating and preventing the recording layer from being denatured. Examples of material employable for the preparation of the subbing layer include polymer materials such as polymethly methacrylate, acrylic acid-methacrylic acid copolymer, polyesters, polyimides, vinyl acetate-vinyl chloride copolymer, ethylene-vinyl acetate copolymer, polyethylene, polypropylene and polycarbonate.

The recording layer is then formed on the subbing layer or directly on the substrate.

The recording layer of the medium of the invention comprises metallic indium (In) and at least one metal compound selected from the group consisting of a metal sulfide, a metal fluoride and a metal oxide and contains at least one metal showing a surface tension of not less than 600 dyne/cm within temperatures of the melting point thereof to a temperature higher than the melting point by 300° C., for instance, in the fused state.

Examples of the metal sulfides employable in the invention include CrS, $Cr_2S$, $Cr_2S_3$, $MoS_2$, MnS, FeS, $FeS_2$, CoS, $Co_2S_3$, NiS, $Ni_2S$, PbS, $Cu_2S$, $Ag_2S$, ZnS, $In_2S_3$, $In_2S_2$, GeS, $GeS_2$, SnS, $SnS_2$, $As_2S_3$, $Sb_2S_3$ and $Bi_2S_3$.

Examples of the metal fluorides employable in the invention include $MgF_2$, $CaF_2$ and $RhF_3$.

Examples of the metal oxides employable in the invention include $In_2O$, $In_2O_3$, PbO and $MoO_2$.

Preferred are GeS, GeO, SnS, $In_2O_3$ and $In_2S_3$.

Examples of the metals showing a surface tension of not less than 600 dyne cm within temperatures of the melting point thereof to a temperature higher than the melting point by 30020 C. include the following metals:
Ag (surface tension: 923 dyne/cm, m.p.: 995° C.);
Au (surface tension: 1124 dyne/cm, m.p.: 1063° C.);
Al (surface tension: 865 dyne/cm, m.p.: 800° C.);
Be (surface tension: 1330 dyne/cm, m.p.: 1282° C.);

Co (surface tension: 1939 dyne/cm, m.p.: 1550° C.);
Cr (surface tension: 1880 dyne/cm, m.p.: 1898° C.);
Cu (surface tension: 1300 dyne/cm, m.p.: 1898° C.);
Cu (surface tension: 1300 dyne/cm, m.p.: 1200° C.);
Fe (surface tension: 1835 dyne/cm, m.p.: 1550° C.);
Ga (surface tension: 735 dyne/cm, m.p.: 50° C.);
Mn (surface tension: 1293 dyne/cm, m.p.: 1243° C.);
Mo (surface tension: 2500 dyne/cm, m.p.: 2607° C.);
Nb (surface tension: 2030 dyne/cm, m.p.: 2468° C.);
Ni (surface tension: 1924 dyne/cm. m.p.: 1500° C.);
Pd (surface tension: 1280 dyne/cm, m.p.: 1552° C.);
Si (surface tension: 730 dyne/cm, m.p.: 1450° C.);
Ti (surface tension: 1510 dyne/cm, m.p.: 1710° C.);
V (surface tension: 1697 dyne/cm, m.p.: 1912° C.);
Zn (surface tension: 774 dyne/cm, m.p.: 600° C.).

In the above description, the surface tension is a value of surface tension measured at a temperature higher than the melting point of the metal by 300° C.

The surface tension of the metal preferably is not lower than 1,000 dyne/cm. Accordingly, preferred metals are Au, Be, Co, Cr, Cu, Fe, Mn, Mo, Nb, Ni, Pd, Ti and V.

The recording layer contains indium preferably in an amount ranging from 30 to 80%, more preferably 50 to 80%, by weight of the recording layer.

The recording layer contains the aforementioned metal compound preferably in an amount ranging from 10 to 50%, more preferably from 30 to 50%, by weight of the recording layer.

The recording layer contains the above-mentioned metal preferably in an amount ranging from 0.1 to 30%, more preferably from 1 to 8%, by weight of the recording layer.

In the recording layer, the content of the above-mentioned metal showing a high surface tension in the recording layer preferably varies along the depth direction of the recording layer in such manner that the content of the metal on the side facing the substrate is higher than that of the metal on the opposite side. The recording layer formed in this manner shows prominently high reliability in the recording procedure.

The recording layer can be formed directly on the substrate or on the subbing layer through vapor deposition, sputtering or ion platting process. For instance, three components, indium, a metal compound and the metal showing high surface tension, are together vapor-deposited on the substrate. The above-described variation of the content of the metal showing high surface tension can be easily produced in the layer by varying the amount of the vaporized metal in the progress of the vapor deposition.

The recording layer may be composed of a single layer or plural layers. The thickness of the recording layer is generallly in the range of 50 to 5,500 angstroms from the viewpoint of optical density required for the optical recording.

A thin film of an inorganic material such as silicon dioxide, tin oxide or manganese fluoride may be formed on the free surface of the substrate (the surface not facing the recording layer) by means of vacuum metallizing or sputtering process in order to increase resistance to damage and moisture protection.

The present invention is further illustrated by the following examples.

EXAMPLE 1

On a polymethyl methacrylate substrate in the form of a disc (outer diameter: 300 mm, thickness: 1.2 mm) was vapor-deposited together In (65 wt. %), Au (5 wt. %) and GeS (30 wt. %) to form a recording layer of 300 angstroms thick. In this vapor deposition procedure, the current for heating the deposition source of Au was controlled to vary the content of Au introduced into the recording layer in such manner that the content of Au decreased in the depth direction from the substrate side to the opposite side Thus, a recording medium according to the invention comprising a substrate and the specific recording layer on the substrate was prepared.

EXAMPLE 2

On a polymethyl methacrylate substrate in the form of a disc (outer diameter: 300 mm, thickness: 1.2 mm) was vapor-deposited together In (6% wt.5), Au (5 wt. %) and GeS (30 wt. %) to form a recording layer of 300 angstroms thick. In this vapor deposition procedure, the current for heating the deposition source of Au was kept constant so as not to vary the content of Au introduced into the recording layer.

Thus, a recording medium according to the invention comprising a substrate and the specific recording layer on the substrate was prepared.

COMPARISON EXAMPLE 1

The procedure of Example 1 were repeated except that the recording layer was formed using In (70 wt. %) and GeS (30 wt. %) only.

Thus, a recording medium comprising a substrate and a conventional recording layer on the substrate was prepared.

COMPARISION EXAMPLE 2

The procedure of Example 1 were repeated except that the recording layer was formed using Al (65 wt. %), Zn (5 wt. %) and GeS (30 wt. %).

Thus, a recording medium comprising a substrate and a recording layer on the substrate was prepared.

COMPARISON EXAMPLE 3

The procedure of Example 1 were repeated except that the recording layer was formed using In (65 wt. %), Te (5 wt. %) and GeS (30 wt. %). The metal "Te" shows a surface tension of lower than 600 in the fused state.

Thus, a recording medium comprising a substrate and a recording layer on the substrate was prepared.

EVALUATION OF RECORDING MEDIUM

The recording media prepared in the examples and comparison examples were evaluated using a Nakamichi Disk Evaluating Device (OMS-1000). The evaluation was done on the medium at a linear rate of 1 m/sec with respect to a maximum recording power measured at the time when C/N ratio (output of carrier/output of noise) reached the maximum level, and the maximum C/N ratio, the B.E.R. (bit error rate) indicating a ratio of error signal in the reproduced signals at the time when the C/N ratio reached the maximum level. The measurement was done by recording binary values (1,0,1,0, . . .) on the medium and detected at a band width of 10 KHz using a spectral analyzer.

The results are set forth in Table 1.

TABLE 1

|  | Composition of Recording Layer | Recording Power (mW) | C/N (dB) | B.E.R. |
| --- | --- | --- | --- | --- |
| Example 1 | In, Au, GeS (65:5:30) | 7 | 55 | $10^{-5}$ |
| Example 2 | In, Au, GeS (65:5:30) | 8 | 50 | $10^{-4}$ |
| Com. Ex. 1 | In, GeS (70:30) | 7 | 45 | $10^{-2}$ |
| Com. Ex. 2 | Al, Zn, GeS (65:5:30) | 12 | 40 | $10^{-2}$ |
| Com. Ex. 3 | In, Te, GeS (65:5:30) | 9 | 40 | $10^{-2}$ |

We claim:

1. A recording medium comprising a substrate and a recording layer arranged on the substrate wherein said recording layer comprises 50 to 80% by weight of indium, 10-50% by weight of at least one metal compound selected from the group consisting of metal sulfide, metal fluoride and metal oxide, and at least 0.1% by weight of at least one metal showing a high surface tension of not less than 600 dyne/cm within temperatures of the melting point thereof to a temperature higher than the melting point by 300° C. and the content of said metal showing a high surface tension varies in the depth direction of the recording layer in such manner that the content of said metal on the side facing the substrate is higher than that of said metal on the opposite side.

2. The recording medium as claimed in claim 1, wherein said metal showing a surface tension of not less than 600 dyne/cm within temperatures of the melting point thereof to a temperature higher than the melting point by 300° C. is a metal selected from the group consisting of Au, Be, Co, Cr, Cu, Fe, Mn, Mo, Nb, Ni, Pd, Ti, and V.

3. The recording medium as claimed in claim 1, wherein said recording layer comprises indium, germanium sulfide, and gold.

4. The recording medium as claimed in claim 1, wherein the content of the metal showing a high surface tension is not less than 1% by weight.

5. The recording medium as claimed in claim 1, wherein the content of the metal showing a high surface tension is not more than 30% by weight.

6. The recording medium as claimed in claim 1, wherein the content of the metal showing a high surface tension is 1 to 8% by weight.

7. The recording medium as claimed in claim 1, wherein the metal showing a high surface tension is gold.

8. An information recording method which comprises irradiating a recording medium comprising a substrate and a recording layer arranged on the substrate wherein said recording layer comprises 50 to 80% by weight of indium, 10-50% by weight of at least one metal compound selected from the group consisting of metal sulfide, metal fluoride and metal oxide, and at least 0.1% by weight of at least one metal showing a high surface tension of not less than 600 dyne/cm within temperatures of the melting point thereof to a temperature higher than the melting point by 300° C. and the content of said metal showing a high surface tension varies in the depth direction of the recording layer in such manner that the content of said metal on the side facing the substrate is higher than that of said metal on the opposite side with radiation having high energy density, to remove the recording layer in the area having received the irradiation through evaporation or fusion.

9. The information recording method as claimed in claim 8, wherein the content of the metal showing a high surface tension is not less than 1% by weight.

10. The information recording method as claimed in claim 8, wherein the content of the metal showing a high surface tension is not more than 30% by weight.

11. The information recording method as claimed in claim 8, wherein the content of the metal showing a high surface tension is 1 to 8% by weight.

12. The information recording method as claimed in claim 8, wherein the metal showing a high surface tension is selected from the group consisting of Au, Be, Co, Cr, Cu, Fe, Mn, Mo, Nb, Ni, Pd, Ti and V.

13. The information recording method as claimed in claim 8, wherein the metal showing a high surface tension is gold.

14. The information recording method as claimed in claim 8 wherein said recording layer comprises, indium, germanium sulphide and gold.

* * * * *